G. H. CORMACK.
MACHINES FOR MAKING OATEN GRITS.

No. 179,100. Patented June 27, 1876.

WITNESSES
Wm. A. Skinkle
F. Stilk

INVENTOR.
George H. Cormack.
By his Attorney
W. D. Baldwin

UNITED STATES PATENT OFFICE.

GEORGE H. CORMACK, OF ROCKFORD, ILLINOIS, ASSIGNOR TO ANDREW M. JOHNSTON & CO., OF SAME PLACE.

IMPROVEMENT IN MACHINES FOR MAKING OATEN GRITS.

Specification forming part of Letters Patent No. 179,100, dated June 27, 1876; application filed May 27, 1876.

*To all whom it may concern:*

Be it known that I, GEORGE H. CORMACK, of Rockford, in the county of Winnebago and State of Illinois, have invented a certain new and useful Machine for Cutting Oats in the Manufacture of Oaten Grits, of which the following is a specification:

My invention relates to a machine of the class in which the grain is fed between vertically-revolving wheels, and acted upon by the adjacent surfaces of the peripheries of the wheels.

My object is to pinch or cut the grains apart transversely in such manner as to form coarse grits, insure the cutting or puncturing of each grain, and avoid the waste occasioned by in part pulverizing or dividing the grains into minute particles; and my invention consists of the combination of a revolving wheel or roller, having a series of annular parallel grooves formed in its periphery, of such shape and size as to receive the grains of oats, hold them and carry them along lengthwise, and a wheel or roller revolving in the opposite direction to, and at a speed corresponding with that of, the grooved wheel, and having a series of teeth working in the grooves of the said grooved wheel, whereby the oats, as they are fed to and carried along by the grooved wheel, are pinched or cut apart transversely by the teeth of the toothed wheel, as will hereinafter more fully be set forth.

Figure 1:
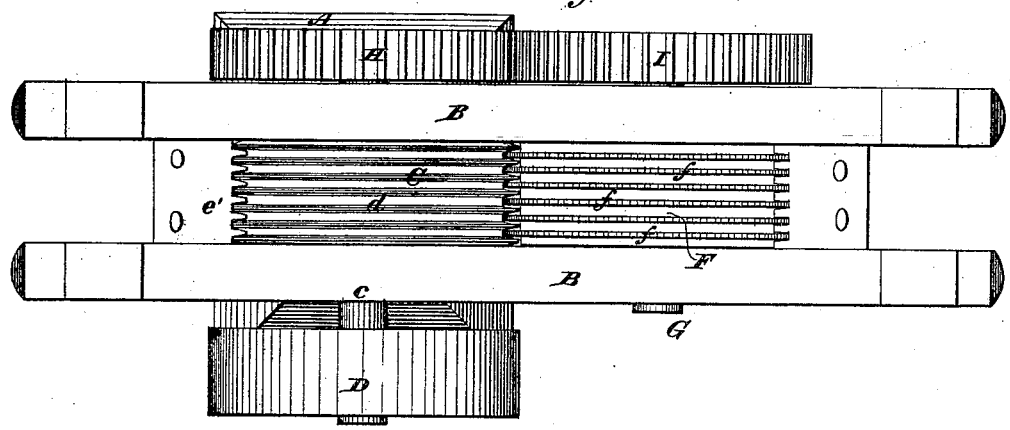
Figure 2:
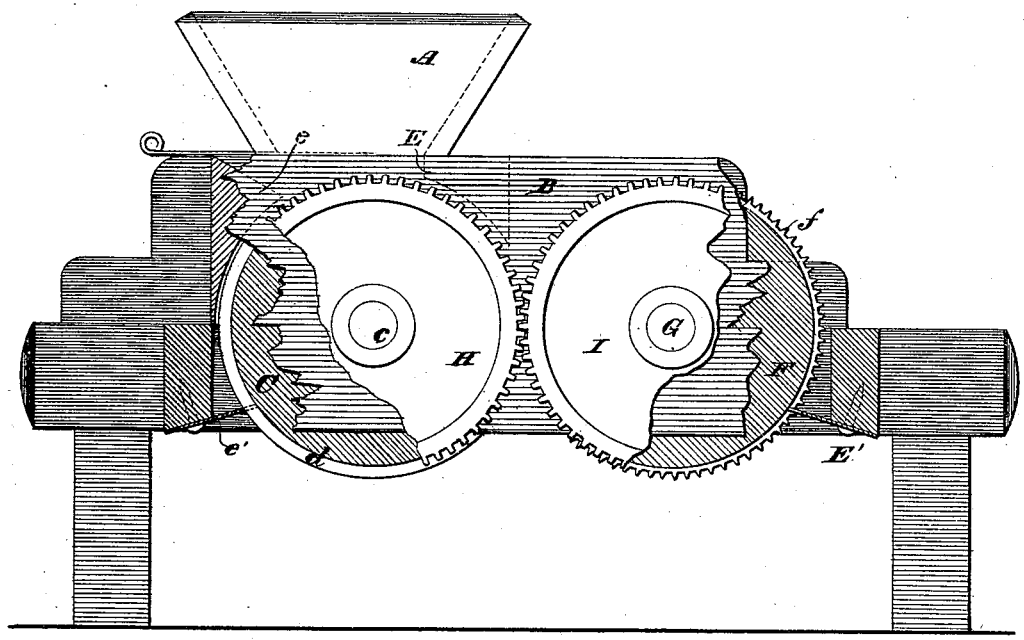

In the accompanying drawings, Figure 1 is a bottom plan view, and Fig. 2 a side elevation, partly in section, of my machine.

A suitable hopper, A, is mounted upon the frame B of the machine, and provided with any proper cut-off or regulating valve, to control the supply of grain to the wheels. Beneath the opening in the bottom of the hopper a grooved wheel, C, is mounted on a shaft, c, revolving in suitable bearings in the supporting-frame A. This wheel C is revolved by means of a band-pulley, D, or by any suitable gearing connected with the shaft c. A scraper, E, fits upon or close to the ridges or ribs between the grooves of the wheel C, to prevent any grains, other than those carried by the grooves, being fed forward by the wheel, while another scraper or guard, e, prevents the escape of grain in a direction the contrary of that desired. A toothed scraper, e', secured upon the under side of the frame, removes any adhering substance from the wheel, and from the sides and bottoms of its grooves, and prevents clogging. A toothed wheel, F, is mounted upon a shaft, G, revolving in suitable bearings in the supporting-frame B. The teeth $f$ of this wheel are arranged opposite to the grooves $d$ of the wheel C, and project into said grooves at the points of contact of the two wheels, as represented in the drawing. The teeth $f$ are preferably formed, as shown, upon ribs projecting from the periphery of the main portion or body of the wheel, so as to form annular channels between the rows of teeth opposite to the ribs of the feed-wheel. The teeth, preferably, have dull points, so as to pinch the grains. They are arranged with the points at distances apart equal to about one-half the length of an averaged-sized grain of oats, or a distance apart a little less than this, to insure the smallest-sized grains being acted upon, as hereinafter explained.

The wheels C and F are caused to revolve at the same rate of speed by means of a gear-wheel, H, on the shaft c meshing into a corresponding gear, I, on the shaft G, or in any other suitable well-known way. A scraper, E', upon the under side of the frame, removes the particles of grain adhering to the sides of the teeth, and in the grooves of the toothed wheel.

In operation, the shelled oats are supplied to the grooved feed-wheel C from the hopper, and are carried along by the revolution of the wheel until they reach the point at which the teeth $f$ act upon them, when they are transversely pinched or cut across by being caught between the said teeth and the bottoms of the grooves in the wheel C. As the wheels C and F revolve in opposite directions, the teeth, when acting upon the grain, move in a direction corresponding to that in which the grains are carried by the feed-wheel, and thus, as both wheels move at the same rate of speed, there is no rubbing or grinding action, but every grain is pinched or cut apart once or oftener, according to its size, and the position it may happen to occupy at the time the teeth are acting. The grits thus formed are discharged beneath the machine from between the wheels.

Obviously, instead of the wheel C being cast in one piece, as shown, it may consist of a main portion, and collars separately formed and shrunk or otherwise secured thereon, or it may be made up of transverse sections; and the toothed wheel, instead of being made in one piece, as shown, may also be made in sections. The bottoms or sides of the grooves may be slightly roughened or indented, to facilitate the feeding of the grain beneath the scraper E and prevent clogging. The grooves in the wheel C, it will be observed, are of such size and shape as to prevent the oats being received crosswise therein, and so carried to the toothed wheel in a position to be acted upon by the teeth in the direction of the length of the grains, or, possibly, pass between them uncut.

I am aware that grain has heretofore been pulverized or ground between saws or saw-toothed wheels, and that the grains have been accumulated in transverse pockets in one set of saws or saw-toothed wheels to be acted upon by the other saws or saw-toothed wheels, and therefore do not claim any such construction. I am not aware of any machine, prior to my invention, by which the grains are pinched or cut apart transversely only by wheels, nor am I aware of any other machine involving the combination of an annularly-grooved wheel, with its grooves separated by ridges or ribs having smooth peripheries, and a toothed wheel, the teeth of which work in the grooves of the grooved wheel, and move with the grains when acting upon them, as in the machine described herein.

I claim as my invention—

1. The combination, substantially as hereinbefore set forth, of the feed-wheel having annular grooves in which the grains lie lengthwise, and the correspondingly grooved toothed cutting-wheel, both wheels revolving at a uniform speed and in opposite directions, the teeth working in the grooves of the feed-wheel to cut or pinch the grain transversely.

2. The machine for preparing oaten grits, hereinbefore described, consisting of the combination of the hopper, the annularly-grooved feed-wheel revolving beneath the opening therein, the annularly-grooved toothed cutter-wheel, revolving in the opposite direction to the grooved wheel and at the same rate of speed, the scrapers for cleaning the grooves of the wheels, and the driving-gearing, these members being constructed and operating in combination, substantially as hereinbefore set forth.

In testimony whereof I have hereunto subscribed my name.

GEORGE H. CORMACK.

Witnesses:
DAVID CORMACK,
GEO. B. FREEMAN.